(12) United States Patent
Gethard

(10) Patent No.: US 10,202,093 B1
(45) Date of Patent: Feb. 12, 2019

(54) BARRIER FOR AN INTERIOR CAB OF VEHICLE

(71) Applicant: Brian Gethard, Florham Park, NJ (US)

(72) Inventor: Brian Gethard, Florham Park, NJ (US)

( * ) Notice: Subject to any disclaimer, the term of this patent is extended or adjusted under 35 U.S.C. 154(b) by 0 days.

(21) Appl. No.: 15/584,183

(22) Filed: May 2, 2017

(51) Int. Cl.
*B60R 21/02* (2006.01)
*B60R 21/12* (2006.01)

(52) U.S. Cl.
CPC ............ *B60R 21/026* (2013.01); *B60R 21/12* (2013.01)

(58) Field of Classification Search
CPC .............................. B60R 21/026; B60R 21/12
USPC ....................................................... 296/24.46
See application file for complete search history.

(56) References Cited

U.S. PATENT DOCUMENTS

| | | | |
|---|---|---|---|
| 3,441,309 A | 4/1969 | Halstead | |
| 3,652,120 A | 3/1972 | Bembach | |
| 4,588,223 A | 5/1986 | Ledenyl | |
| 6,595,567 B1 | 7/2003 | Ament | |
| 6,827,382 B2 | 12/2004 | Murray | |
| 6,962,382 B2 * | 11/2005 | Scarlett | ................. B60R 21/026 296/24.42 |
| D567,742 S | 4/2008 | Spater | |
| 2015/0144671 A1 * | 5/2015 | Seifert | .................... B60R 7/005 224/539 |

* cited by examiner

*Primary Examiner* — Joseph D. Pape
*Assistant Examiner* — Dana D Ivey
(74) *Attorney, Agent, or Firm* — Kyle A. Fletcher, Esq.

(57) ABSTRACT

The barrier for an interior cab of a vehicle is a removable barrier. The barrier for an interior cab of a vehicle is configured for use with a vehicle. The vehicle is defined with an interior space called a cab. The barrier for an interior cab of a vehicle forms a physical structure that prevents occupants of a section of the cab selected from the front section and the rear sections to move to the unselected section of the cab. The barrier for an interior cab of a vehicle attaches to the first head rest and the second head rest. The barrier for an interior cab of a vehicle comprises a first barrier and a second barrier. The first barrier and the second barrier are identical. The first barrier and the second barrier are positioned as mirror images of each other.

16 Claims, 3 Drawing Sheets

BARRIER FOR AN INTERIOR CAB OF VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles, more specifically, an arrangement that protects the occupant against personal attacks from inside the vehicle.

SUMMARY OF INVENTION

The barrier for an interior cab of a vehicle is a removable barrier. The barrier for an interior cab of a vehicle is configured for use with a vehicle. The vehicle is defined with an interior space called a cab. The cab is further defined with a first front seat and a second front seat. The first front seat and the second front seat subdivide the cab into a front section and a rear section. The first front seat is further defined with a first head rest. The second front seat is further defined with a second head rest. The first head rest is further defined with a first head rest shaft and a second head rest shaft. The second head rest is further defined with a third head rest shaft and a fourth head rest shaft.

The barrier for an interior cab of a vehicle forms a physical structure that prevents occupants of a section of the cab selected from the front section and the rear section to move to the unselected section of the cab. The barrier for an interior cab of a vehicle attaches to the first head rest and the second head rest. The barrier for an interior cab of a vehicle comprises a first barrier and a second barrier. The first barrier and the second barrier are identical. The first barrier and the second barrier are positioned as mirror images of each other.

These together with additional objects, features and advantages of the barrier for an interior cab of a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the barrier for an interior cab of a vehicle in detail, it is to be understood that the barrier for an interior cab of a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the barrier for an interior cab of a vehicle.

It is therefore important that the claims be regarded as including such equivalent construction insofar as they do not depart from the spirit and scope of the barrier for an interior cab of a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
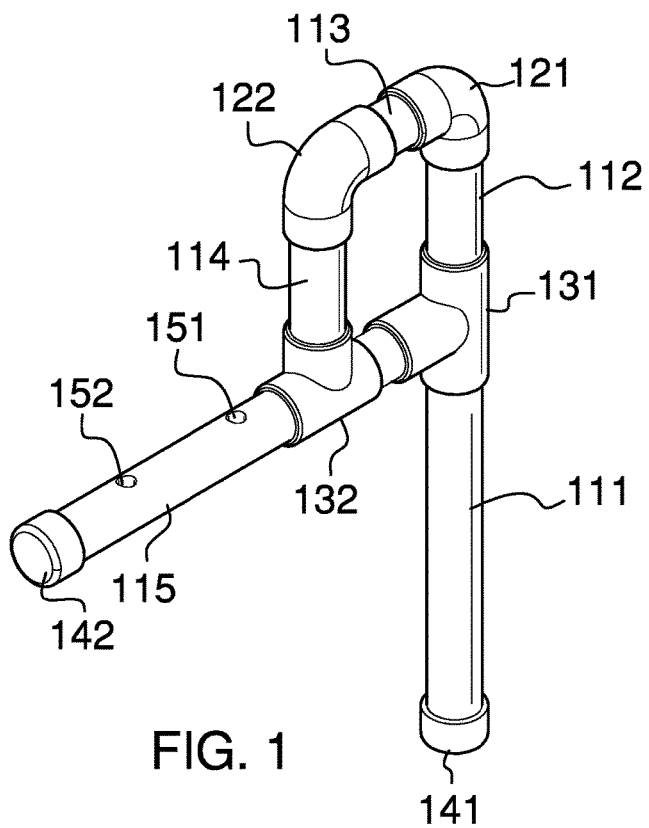
FIG. 1 is a perspective view of an embodiment of the disclosure.
Figure 2:
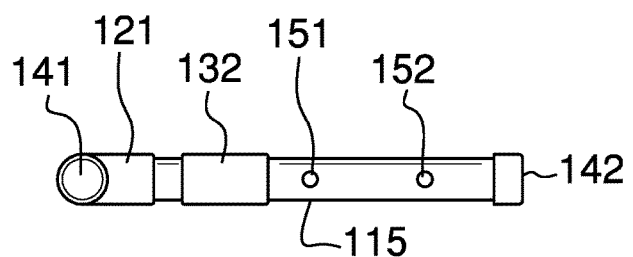
FIG. 2 is a bottom view of an embodiment of the disclosure.
Figure 3:
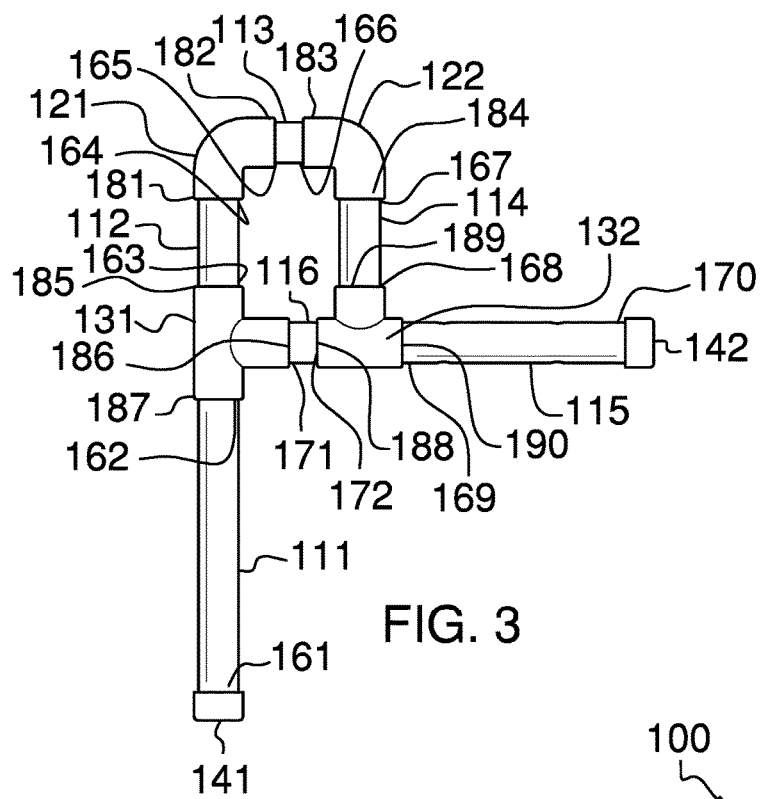
FIG. 3 is a front view of an embodiment of the disclosure.
Figure 4:
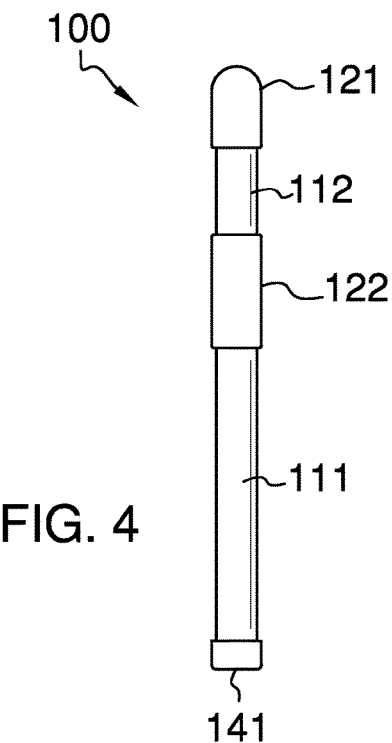
FIG. 4 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The barrier for an interior cab of a vehicle 100 (hereinafter invention) is a removable barrier. The invention 100 is configured for use with a vehicle 105. The vehicle 105 is assumed to be an automobile. The vehicle 105 is defined with an interior space called a cab. The cab is further defined with a first front seat 191 and a second front seat 192. The first front seat 191 and the second front seat 192 subdivide the cab into a front section and a rear section. The first front seat 191 is further defined with a first head rest 194. The second front seat 192 is further defined with a second head rest 195. The first head rest 194 is further defined with a first head rest shaft 196 and a second head rest shaft 197. The second head rest 195 is further defined with a third head rest shaft 198 and a fourth head rest shaft 199.

The invention 100 forms a physical structure that prevents an occupant of a section of the cab selected from the front section and the rear section to move to the unselected section of the cab. The invention 100 attaches to the first head rest 194 and the second head rest 195. The invention 100 comprises a first barrier 101 and a second barrier 102. The first barrier 101 and the second barrier 102 are identical. The first barrier 101 and the second barrier 102 are installed as mirror images of each other.

The invention 100 comprises a first barrier 101 and a second barrier 102. The first barrier 101 is a P shaped structure is placed between the first front seat 191 and the second front seat 192. The second barrier 102 is a P shaped structure is placed between the first front seat 191 and the second front seat 192. The first barrier 101 is identical to the second barrier 102. Within this disclosure, the first barrier 101 will be described in detail with the understanding that everything said about the first barrier 101 applies to the second barrier 102.

The first barrier 101 comprises a first tube 111, a second tube 112, a third tube 113, a fourth tube 114, a fifth tube 115, a sixth tube 116, a first 90 degree elbow 121, a second 90 degree elbow 122, a first tee connector 131, and a second tee connector 132. The first 90 degree elbow 121, the second 90 degree elbow 122, the first tee connector 131, and the second tee connector 132 interconnect the first tube 111, the second tube 112, the third tube 113, the fourth tube 114, the fifth tube 115, and the sixth tube 116.

The first tube 111 is further defined with a first end 161 and a second end 162. The second tube 112 is further defined with a third end 163 and a fourth end 164. The third tube 113 is further defined with a fifth end 165 and a sixth end 166. The fourth tube 114 is further defined with a seventh end 167 and an eighth end 168. The fifth tube 115 is further defined with a ninth end 169 and a tenth end 170. The sixth tube 116 is further defined with an eleventh end 171 and a twelfth end 172.

The first 90 degree elbow 121 is further defined with a first port 181 and a second port 182. The second 90 degree elbow 122 is further defined with a third port 183 and a fourth port 184.

The first tee connector 131 is further defined with a fifth port 185, a sixth port 186, and a seventh port 187. The second tee connector 132 is further defined with an eighth port 188, a ninth port 189, and a tenth port 190. The center axis of the sixth port 186 of the first tee connector 131 is perpendicular to the to the center axis that connects the fifth port 185 and the seventh port 187 of the first tee connector 131. The center axis of the ninth port 189 of the second tee connector 132 is perpendicular to the to the center axis that connects the eighth port 188 and the tenth port 190 of the second tee connector 132.

In the first potential embodiment of the disclosure, the first tube 111 is a readily and commercially available polyvinylchloride pipe. The second tube 112 is a readily and commercially available polyvinylchloride pipe. The third tube 113 is a readily and commercially available polyvinylchloride pipe. The fourth tube 114 is a readily and commercially available polyvinylchloride pipe. The fifth tube 115 is a readily and commercially available polyvinylchloride pipe. The sixth tube 116 is a readily and commercially available polyvinylchloride pipe.

The first 90 degree elbow 121 is a readily and commercially available plumbing fitting formed from polyvinylchloride. The second 90 degree elbow 122 is a readily and commercially available plumbing fitting formed from polyvinylchloride.

The first tee connector 131 is a readily and commercially available plumbing fitting formed from polyvinylchloride. The second tee connector 132 is a readily and commercially available plumbing fitting formed from polyvinylchloride.

The first end cap 141 is a readily and commercially available plumbing fitting formed from polyvinylchloride. The second end cap 142 is a readily and commercially available plumbing fitting formed from polyvinylchloride.

The first radial hole 151 is a radial hole that is formed perpendicularly through the center axis of the fifth tube 115. The second radial hole 152 is a radial hole that is formed perpendicularly through the center axis of the fifth tube 115.

The spacing between the first radial hole 151 and the second radial hole 152 matches the spacing between the first head rest shaft 196 and the second head rest shaft 197 such that when the center axis of the first radial hole 151 is aligned with the center axis of the first head rest shaft 196 the center axis of the second radial hole 152 can be aligned with the center axis of the second head rest shaft 197. The spacing between the first radial hole 151 and the second radial hole 152 matches the spacing between the third head rest shaft 198 and the fourth head rest shaft 199 such that when the center axis of the first radial hole 151 is aligned with the center axis of the third head rest shaft 198 the center axis of the second radial hole 152 can be aligned with the center axis of the fourth head rest shaft 199.

The assembly of the invention 100 is described in the following 6 paragraphs

The first 90 degree elbow 121 attaches the second tube 112 and the third tube 113. The fourth end 164 of the second tube 112 inserts into the first port 181 of the first 90 degree elbow 121. The fifth end 165 of the third tube 113 inserts into the second port 182 of the first 90 degree elbow 121.

The second 90 degree elbow 122 attaches the third tube 113 and the fourth tube 114. The sixth end 166 of the third tube 113 inserts into the third port 183 of the second 90 degree elbow 122. The seventh end 167 of the fourth tube 114 inserts into the fourth port 184 of the second 90 degree elbow 122.

The first tee connector 131 interconnects the first tube 111, the second tube 112, and the sixth tube 116. The second end 162 of the first tube 111 inserts into the seventh port 187 of the first tee connector 131. The third end 163 of the second tube 112 inserts into the fifth port 185 of the first tee connector 131. The eleventh end 171 of the sixth tube 116 inserts into the sixth port 186 of the first tee connector 131.

The second tee connector 132 interconnects the sixth tube 116, the fourth tube 114, and the fifth tube 115. The twelfth end 172 of the sixth tube 116 inserts into the eighth port 188 of the second tee connector 132. The eighth end 168 of the fourth tube 114 inserts into the ninth port 189 of the second tee connector 132. The ninth end 169 of the fifth tube 115 inserts into the tenth port 190 of the second tee connector 132.

The first end cap 141 is placed over the first end 161 of the first tube 111. The second end cap 142 is placed over the tenth end 170 of the fifth tube 115.

The first radial hole 151 is positioned between the ninth end 169 of the fifth tube 115 and the second radial hole 152. The second radial hole 152 is positioned between the tenth end 170 of the fifth tube 115 and the first radial hole 151. The second radial hole 152 is positioned relative to the first radial hole 151 such that the center axis of the second radial hole 152 is parallel to the first radial hole 151.

To install the invention 100, the first barrier 101 attaches to the first front seat 191 and the second barrier 102 attaches to the second front seat 192. The installation details are described in the following 3 paragraphs.

Figure 5:
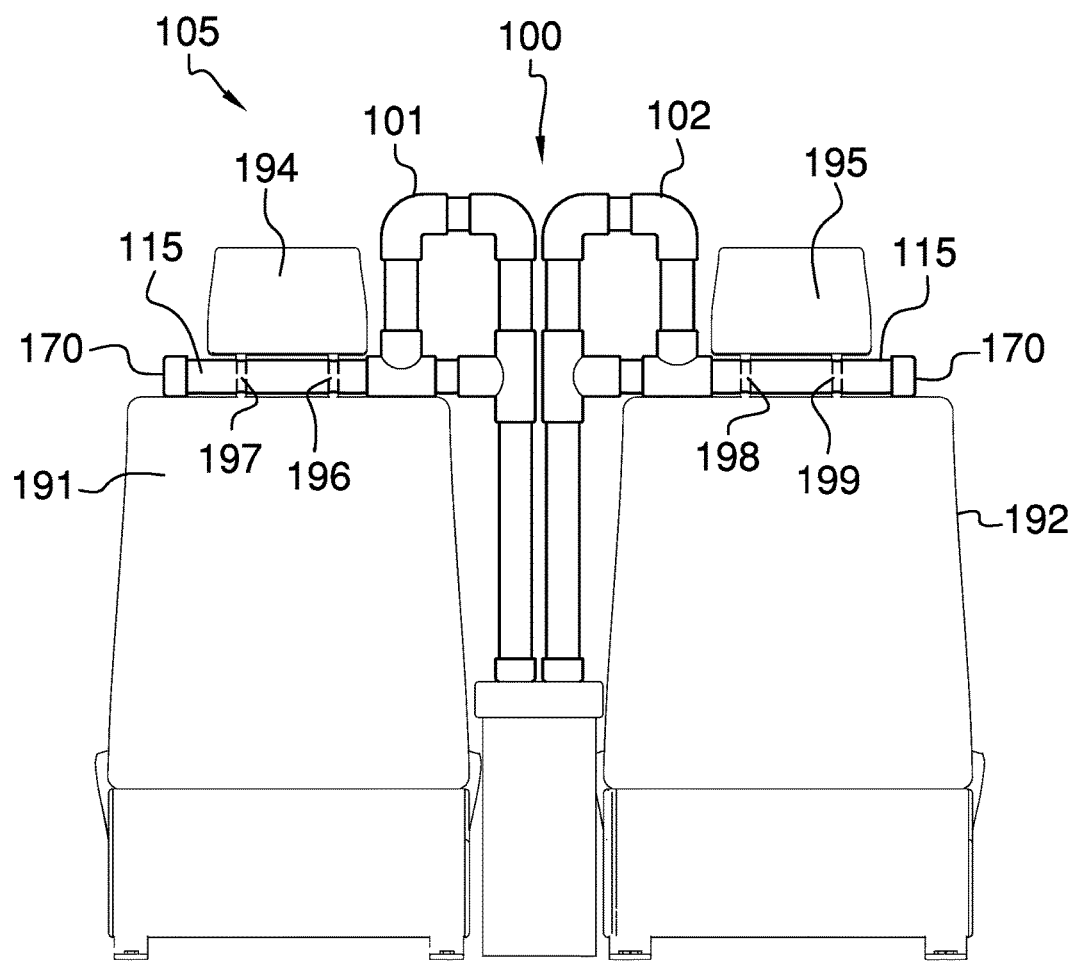
FIG. 5 is an in use view of an embodiment of the disclosure.

As shown most clearly in FIG. 5, the first barrier 101 and the second barrier 102 form a barricade surface in the lateral direction between the first front seat 191 and the second front seat 192. The first barrier 101 is installed such that: 1) the first tube 111 and the second tube 112 form the medial edge of the first barrier 101; and, 2) the second end cap 142 on the tenth end 170 of the fifth tube 115 is the distal structure of the first barrier 101 from the medial edge. The first barrier 101 is installed such that the first end cap 141 on the first end 161 of the first tube 111 is the inferior structure of the first barrier 101. The second barrier 102 is installed in the second front seat 192 in the same manner as the first barrier 101. When installed properly, the second barrier 102 is a mirror image of the first barrier 101.

To install the first barrier 101 the first head rest 194 is removed from the first front seat 191. The first head rest shaft 196 is inserted through the first radial hole 151 of the fifth tube 115 of the first barrier 101. The second head rest shaft 197 is inserted through the second radial hole 152 of the fifth tube 115 of the first barrier 101. The first head rest 194 is reinserted into the first front seat 191 in the normal manner.

To install the second barrier 102 the second head rest 195 is removed from the second front seat 192. The third head rest shaft 198 is inserted through the first radial hole 151 of the fifth tube 115 of the second barrier 102. The fourth head rest shaft 199 is inserted through the second radial hole 152 of the fifth tube 115 of the second barrier 102. The second head rest 195 is reinserted into the second front seat 192 in the normal manner.

The following definitions were used in this disclosure:

90 Degree Elbow: As used in this disclosure, a 90 degree elbow is a two aperture fitting that attaches a first pipe to a second pipe such that the center axis of the first pipe is perpendicular to the center axis of the second pipe.

Align: As used in this disclosure, align refers to an arrangement of objects that are: 1) arranged in a straight line; or, 2) arranged to give a directional sense of a plurality of parallel lines.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Exterior: As used in this disclosure, the exterior is use as a relational term that implies that an object is not contained within the boundary of a structure or a space.

Inferior: As used in this disclosure, the term inferior refers to a directional reference that is parallel to and in the same direction as the force of gravity.

Interior: As used in this disclosure, the interior is use as a relational term that implies that an object is contained within the boundary of a structure or a space.

Lateral: As used in this disclosure, the term lateral refers to a direction that is perpendicular to a previously identified central axis. Within this disclosure, the identified central axis is the normal direction of motion of the vehicle.

Medial: As used in this disclosure, the term medial is used to describe the relative location of two objects. The medial object is the object that is closer to a previously specified center axis. Within this disclosure, the identified central axis is the normal direction of motion of the vehicle.

Pipe: As used in this disclosure, the term pipe is used to describe a rigid hollow cylinder. While pipes that are suitable for use in this disclosure are often used to transport or conveys fluids or gases, the purpose of the pipes in this disclosure are structural. In this disclosure, the terms inner diameter of a pipe and outer diameter are used as they would be used by those skilled in the plumbing arts.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe, or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Superior: As used in this disclosure, the term superior refers to a directional reference that is parallel to and in the opposite direction of the force of gravity.

Tee Connector: As used in this disclosure, a T Connector is a 3 aperture fitting that is designed to connect three pipes together. A typical T Connector has a two pipe configuration wherein: 1) a first aperture is at a first end of the first pipe; 2) a second aperture is at the second end of the first pipe; 3) a second pipe projects away from the first pipe such that the center axis of the second pipe intersects perpendicularly with the center axis of the first pipe; 4) the second pipe provides access to interior of the first pipe; and, 5) a third aperture is at the end of the second pipe that is distal from the first pipe.

Vehicle: As used in this disclosure, a motorized vehicle is a device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A protective arrangement comprising:
   a first barrier and a second barrier;
   wherein the first barrier and the second barrier are identical;
   wherein the first barrier and the second barrier are installed as mirror images of each other;
   wherein the protective arrangement is configured for use with a vehicle;
   wherein the vehicle is defined with an interior space called a cab;
   wherein the cab is further defined with a first front seat and a second front seat;
   wherein the first front seat is further defined with a first head rest;
   wherein the second front seat is further defined with a second head rest;
   wherein the first head rest is further defined with a first head rest shaft and a second head rest shaft;
   wherein the second head rest is further defined with a third head rest shaft and a fourth head rest shaft;
   wherein the protective arrangement forms a physical structure that separates the cab from the unselected section of the cab;
   wherein the first barrier removably attaches to the first head rest;
   wherein the second barrier removably attaches to the second head rest;
   wherein the first barrier attaches to the first front seat;
   wherein the second barrier attaches to the second front seat;
   wherein the first barrier and the second barrier form a barricade surface in the lateral direction between the first front seat and the second front seat;
   wherein the first barrier is a P shaped structure;
   wherein the second barrier is a P shaped structure;
   wherein the first barrier is placed between the first front seat and the second front seat;
   wherein the second barrier is placed between the first front seat and the second front seat;
   wherein the first barrier comprises a first tube, a second tube, a third tube, a fourth tube, a fifth tube, a sixth tube, a first 90 degree elbow, a second 90 degree elbow, a first tee connector, and a second tee connector;
   wherein the first 90 degree elbow, the second 90 degree elbow, the first tee connector, and the second tee connector interconnect the first tube, the second tube, the third tube, the fourth tube, the fifth tube, and the sixth tube;
   wherein the first tube is further defined with a first end and a second end;
   wherein the second tube is further defined with a third end and a fourth end;
   wherein the third tube is further defined with a fifth end and a sixth end;
   wherein the fourth tube is further defined with a seventh end and an eighth end;
   wherein the fifth tube is further defined with a ninth end, and a tenth end;
   wherein the sixth tube is further defined with an eleventh end and a twelfth end;
   wherein the first 90 degree elbow is further defined with a first port and a second port;
   wherein the second 90 degree elbow is further defined with a third port and a fourth port;
   wherein the first tee connector is further defined with a fifth port, a sixth port, and a seventh port;
   wherein the second tee connector is further defined with an eighth port, a ninth port, and a tenth port;
   wherein the sixth port of the first tee connector is perpendicular to the fifth port and the seventh port of the first tee connector;
   wherein the ninth port of the second tee connector is perpendicular to the eighth port and the tenth port of the second tee connector.

2. The protective arrangement according to claim 1
   wherein the first tube is a pipe;
   wherein the second tube is a pipe;
   wherein the third tube is a pipe;
   wherein the fourth tube is a pipe;
   wherein the fifth tube is a pipe;
   wherein the sixth tube is a pipe;
   wherein the first 90 degree elbow is a plumbing fitting;
   wherein the second 90 degree elbow is a plumbing fitting;
   wherein the first tee connector is a plumbing fitting;
   wherein the second tee connector is a plumbing fitting;
   wherein the first end cap is a plumbing fitting;
   wherein the second end cap is a plumbing fitting.

3. The protective arrangement according to claim 2
   wherein the first radial hole is a radial hole that is formed perpendicularly through the fifth tube;
   wherein the second radial hole is a radial hole that is formed perpendicularly through the fifth tube.

4. The protective arrangement according to claim 3 wherein the spacing between the first radial hole and the second radial hole matches the spacing between the first head rest shaft and the second head rest shaft such that when first radial hole is aligned with the first head rest shaft, the second radial hole is aligned with the second head rest shaft.

5. The protective arrangement according to claim 4 wherein the spacing between the first radial hole and the second radial hole matches the spacing between the third head rest shaft and the fourth head rest shaft such that when the first radial hole is aligned with the third head rest shaft, the second radial hole is aligned with the fourth head rest shaft.

6. The protective arrangement according to claim 5
   wherein the first radial hole is positioned between the ninth end of the fifth tube and the second radial hole;
   wherein the second radial hole is positioned between the tenth end of the fifth tube and the first radial hole.

7. The protective arrangement according to claim 6 wherein the second radial hole is positioned relative to the first radial hole such that the second radial hole is parallel to the first radial hole.

8. The protective arrangement according to claim 7
   wherein the first end cap is placed over the first end of the first tube;
   wherein the second end cap is placed over the tenth end of the fifth tube.

9. The protective arrangement according to claim 8
wherein the first 90 degree elbow attaches the second tube and the third tube;
wherein the fourth end of the second tube inserts into the first port of the first 90 degree elbow;
wherein the fifth end of the third tube inserts into the second port of the first 90 degree elbow.

10. The protective arrangement according to claim 9
wherein the second 90 degree elbow attaches the third tube and the fourth tube;
wherein the sixth end of the third tube inserts into the third port of the second 90 degree elbow;
wherein the seventh end of the fourth tube inserts into the fourth port of the second 90 degree elbow.

11. The protective arrangement according to claim 10
wherein the first tee connector interconnects the first tube, the second tube, and the sixth tube;
wherein the second end of the first tube inserts into the seventh port of the first tee connector;
wherein the third end of the second tube inserts into the fifth port of the first tee connector;
wherein the eleventh end of the sixth tube inserts into the sixth port of the first tee connector.

12. The protective arrangement according to claim 11
wherein the second tee connector interconnects the sixth tube, the fourth tube, and the fifth tube;
wherein the twelfth end of the sixth tube inserts into the eighth port of the second tee connector;
wherein the eighth end of the fourth tube inserts into the ninth port of the second tee connector;
wherein the ninth end of the fifth tube inserts into the tenth port of the second tee connector.

13. The protective arrangement according to claim 12
wherein the first barrier is installed such that the first tube and the second tube form the medial edge of the first barrier;
wherein the first barrier is installed such that the second end cap on the tenth end of the fifth tube is the distal structure of the first barrier from the medial edge;
wherein the first barrier is installed such that the first end cap on the first end of the first tube is the inferior structure of the first barrier.

14. The protective arrangement according to claim 13
wherein the second barrier is installed in the same manner and as a mirror image of the first barrier.

15. The protective arrangement according to claim 14
wherein the first head rest shaft is inserted through the first radial hole of the fifth tube of the first barrier;
wherein the second head rest shaft is inserted through the second radial hole of the fifth tube of the first barrier.

16. The protective arrangement according to claim 15
wherein the third head rest shaft is inserted through the first radial hole of the fifth tube of the second barrier;
wherein the fourth head rest shaft is inserted through the second radial hole of the fifth tube of the second barrier.

* * * * *